United States Patent [19]

Hess

[11] Patent Number: 4,831,373

[45] Date of Patent: May 16, 1989

[54] METHOD FOR DYNAMICALLY ALLOCATING DATA CHANNELS ON A TRUNKED COMMUNICATION SYSTEM

[75] Inventor: Garry C. Hess, Hanover Park, Ill.

[73] Assignee: Motorola, Inc., Schaumburg, Ill.

[21] Appl. No.: 44,380

[22] Filed: Apr. 30, 1987

[51] Int. Cl.$^4$ ............................................. H04Q 7/00
[52] U.S. Cl. ........................ 340/825.03; 340/825.44; 455/17; 455/33
[58] Field of Search ............... 340/825.03, 825.01, 340/825.44; 455/17, 33, 34, 54; 370/95; 371/33

[56] References Cited

U.S. PATENT DOCUMENTS

| | | | |
|---|---|---|---|
| 4,012,597 | 3/1977 | Lynk, Jr. et al. | 455/53 |
| 4,352,183 | 9/1982 | Davis et al. | 371/33 |
| 4,551,852 | 11/1985 | Grauel et al. | 455/54 |
| 4,553,262 | 11/1985 | Coe | 455/15 |
| 4,556,972 | 12/1985 | Chan et al. | 370/95 |
| 4,573,206 | 2/1986 | Grauel et al. | 455/33 |
| 4,574,163 | 3/1986 | Zato | 379/62 |
| 4,578,815 | 3/1986 | Persinotti | 455/33 |
| 4,593,389 | 6/1986 | Wurzburg et al. | 370/110.1 |
| 4,609,778 | 9/1986 | Franklin et al. | 379/243 |
| 4,698,805 | 10/1987 | Sasuta et al. | 455/17 |

Primary Examiner—Donald J. Yusko
Attorney, Agent, or Firm—Thomas G. Berry; Wayne J. Egan

[57] ABSTRACT

Disclosed is a method to dynamically allocate a number of data channels on a trunked radio system (100). The data activity is monitored during a predetermined time interval. If activity is above predetermined maximum, an additional channel may be reserved for data use. Conversely, if data traffic is low, a data channel may be reallocated for voice message use. Moreover, should the amount of data traffic among the available data channels be unbalanced, the present method contemplates reassigning subscriber units (114 or 116) to the available data channels to balance the data traffic load, thereby providing superior access time and system performance.

10 Claims, 6 Drawing Sheets

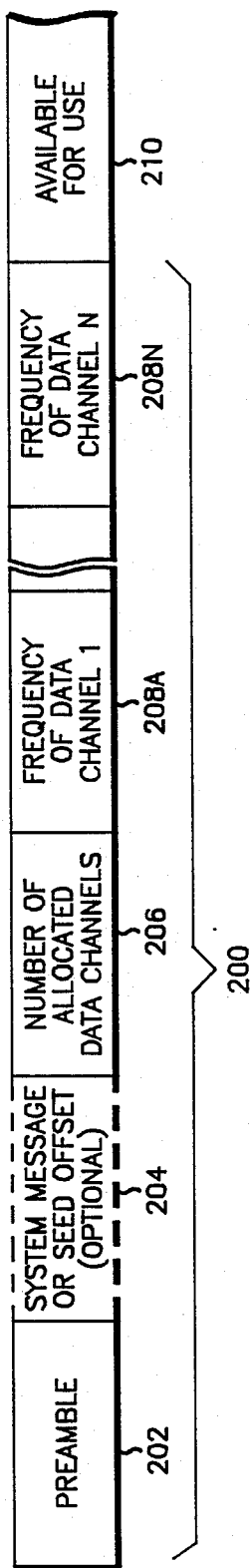
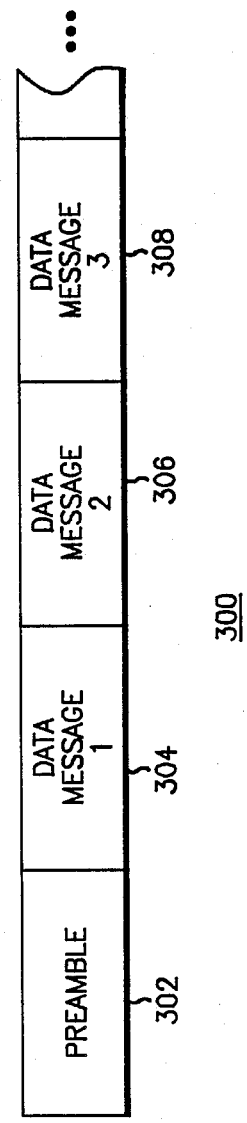

METHOD FOR DYNAMICALLY ALLOCATING DATA CHANNELS ON A TRUNKED COMMUNICATION SYSTEM

TECHNICAL FIELD

This invention relates generally to trunked communications systems and more particularly to trunked communication systems that transceive both voice and data.

BACKGROUND ART

In a basic RF trunked system there exists a high degree of flexibility to partition voice conversations between different groups so that no one group of users is specifically aware when another group of users makes use of the system. Typically, these groups are subdivided into subgroups so that calls may be made upon either a group, subgroup or individual basis depending upon the type of communication desired by an initiating subscriber.

To establish a voice communication between a group of units operating on a trunked system, a subscriber unit transmits a data packet called an "inbound signalling word" (ISW) on a control channel that is maintained for such purposes. The ISW contains at least the requesting unit's unique ID code, which may contain or be used to obtain the requesting subscriber's current talk-group. The request is forwarded to a central controller, which decodes the request, and transmits on the control channel a data packet called an "outbound signalling word" (OSW) to all subscriber units, which continuously monitor the control channel when not participating in a voice conversation. The OSW is a channel grant which contains the talk-group code of the requesting unit, and the voice channel number assigned for the conversation. The OSW causes the requesting unit to move to the voice channel and commence transmitting, while simultaneously causing all other subscriber units in the same talk-group to move to the voice channel as listening units. In this way a group call is set up. If, however, all voice channels are in use when a subscriber unit transmits an ISW, the central controller typically send the requesting subscriber a "busy OSW".

In addition to voice messages, it is desirable to send data information across a trunked radio channel. In some data systems, a subscriber unit obtains a trunked data communication channel via the same procedure used to obtain a voice channel. However, this practice is inefficient and spectrally wasteful, due to the time it takes for a requesting subscriber to transmit an ISW and receive a channel grant OSW from the central, and the time it takes to set-up and clean-down a call on a voice channel. At contemporary data transmission rates, it is anticipated that an entire typical data message would take substantially less time to transmit than the time required to obtain a channel (approximately 0.5 seconds). Thus, assigning a data channel pursuant to the same procedure as assigning a voice channel would be wasteful of spectrum and consume precious system time that could be better used to transmit data messages.

Other trunked communication systems desirous to accommodate data traffic have permanently dedicated one or more channels to handling data traffic. While this avoids the access time problem noted above, this technique is contrary to the basic principles of trunked communication systems, which strive to allocate channel resources across a plurality of users as required. Therefore, the practice of having dedicated data channels, permanently removed from the channel allocation "pool" of frequencies, is wasteful of spectral resources and leads to inefficient system operation. Moreover, the dedicated data channel systems lack the capacity to dynamically redistribute or allocate the data traffic load across the available data channels. Such systems typically permanently assign a subscriber unit to a data channel thereby building in future problems as the number of data subscribers increases on a particular channel.

Accordingly, there exists a need for a trunked communication system that can accommodate both voice and data signals, and that operates in true trunked manner to efficiently utilize spectral resources.

SUMMARY OF THE INVENTION

Accordingly, it is an object of the present invention to provide an improved trunked communication system.

It is another object of the present invention to provide a procedure to dynamically allocate data channels on a trunked radio system.

It is a further object of the present invention to redistribute or balance the data traffic load on the particular number of data channels currently available.

It is another object of the present invention to provide a rapid and convenient method to broadcast system wide data messages to all data subscribers.

Accordingly, these and other objects are achieved by the present invention's dynamic allocation of data channels in a trunked radio system.

Briefly, according to the invention, a method is disclosed to dynamically allocate a number of data channels on a trunked radio system. The data activity is monitored during a predetermined time interval. If activity is above a predetermined maximum, an additional channel is reserved for data use. Conversely, if data traffic is low, a data channel is reallocated for voice message use. Moreover, should the amount of data traffic between the available data channels be unbalanced, the present invention contemplates reassigning subscriber units to the available data channels to balance the data traffic load, thereby providing superior access time and system performance.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures of which like referenced numerals identify like elements, and in which:

FIG. 2 is an illustration of the preferred signalling format for a master data channel;

FIG. 3 is an illustration of the preferred signalling format for other data channels;

DETAILED DESCRIPTION OF THE PREFERRED EMBODIMENT

Figure 1:
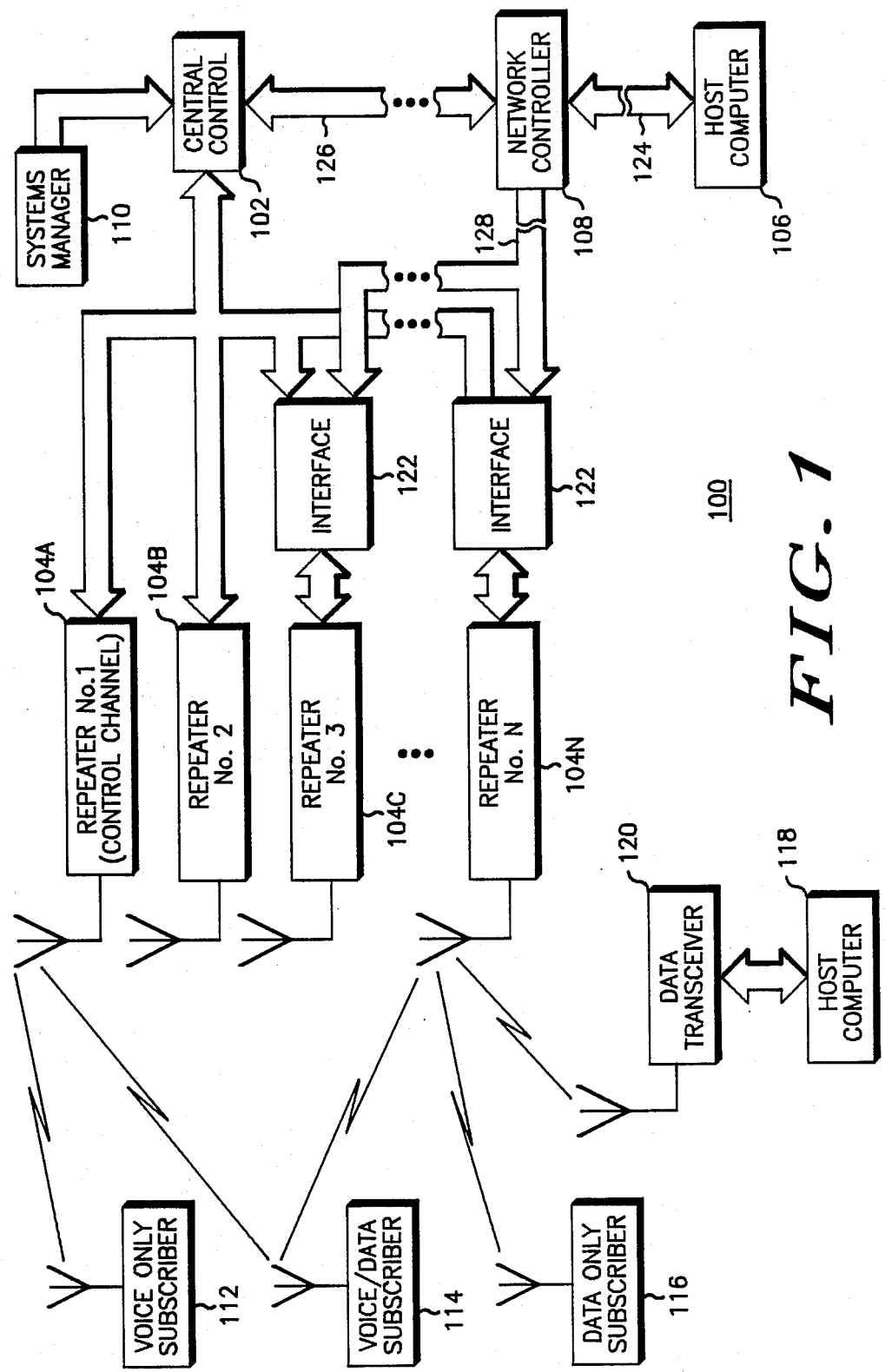
FIG. 1 is a block diagram of a trunked radio system that may employ the present invention.

Referring now to the drawings, and in particular to FIG. 1, there is shown a block diagram of a trunked voice/data communication system (100) that may employ the present invention. The centralized or fixed-end equipment comprises a central controller 102, which is responsible for allocating the channel resources (represented here by repeaters 104a–104N) amongst the many subscriber units. Of the available communication channels, one (repeater 104a) is selected to be a voice control channel, which communicates with any trunked subscriber capable of transmitting voice traffic.

Preferably, each of the repeaters 104a-N are capable of operating as a voice channel, control channel, or data channel. To accommodate data traffic, such repeaters are equipped with a data interface 122. The data interfaces 122 are responsible for encoding outbound data, decoding and error correcting inbound data, repeater control, and providing an interface between the repeater and the network controller 108. Alternately, a predetermined subset of the total number of repeaters may be equipped for data or used as a control channel. Typically, the particular repeater selected to be the control channel (104a) is periodically changed as a control measure.

The data network comprises at least one host computer 106, which is coupled (i.e. wireline) to a network controller 108. The network controller 108 is responsible for data traffic routing and communicating with the central controller 102 to request the allocation of a data channel. Those skilled in the art will appreciate that if the host computer 106, the network controller 108 and the central controller 102 are co-located, the intercouplings (124–128) may be direct. However, should remote locations be desired, such communications may be maintained through the use of data modems as is known in the art. Optionally, or additionally, the trunked voice/data communication system 100 may employ one or more radio frequency (RF) coupled host computers 118. The RF host 118 communicates as a trunked control station via any suitable data transceiver 120. The primary difference between the wireline host 106 and the RF host 118 is that the data subscribers communicate directly (i.e., via both the inbound and outbound frequencies of a data equipped repeater) with the RF host, whereas the wireline host 106 transceives all information via the inbound or outbound frequency of a data equipped repeater. Accordingly, the data network of the present invention may employ several computers in either a centralized or distributed processing arrangement.

Generally, the fixed-end equipment also includes a system manager console 110 that enables the supervisor of a communication service provider to set a number of operational parameters that control the operation of the trunked communication system. Typical examples of such parameters include the maximum number of assignable data channels (if any), whether voice or data will be the priority traffic, and various threshold values that control when data channels may be added or reallocated to voice traffic. Thus, at any particular time, the trunked communication system of the present invention need not have any channels allocated for data traffic. Conversely, if voice traffic is low, or if data traffic enjoys a priority status or is particularly heavy, one or more channels may be allocated for data communication.

According to the present invention, a predetermined channel ordinarily comprises the first channel to be allocated for data. Preferably, this first assigned data channel (hereinafter "the master data channel") has the same frequency as any single frequency data-only subscribers (116) to provide maximum compatibility with existing data equipment. Alternately a random channel may be the first assigned data channel; however, the data-only subscribers must scan the available channels to find it. Thus, the present invention prefers to first assign a selected channel, and, thereafter, assign any other data equipped (122) channel as an additional data channel The present invention allocates data channels for a time interval determined by either the system manager or a default parameter. The length of the allocation period may vary with the time of day, system loading or other such parameters. By reserving a channel for data use over a time period, data channel requests are minimized and spectral efficiency is maximized since a data subscriber need not request a data channel for each separate data transmission.

As a general principle, the goal of any trunked communication system is to effectively allocate the limited channel resources amongst a plurality of subscriber units. The present invention contemplates three classes of subscriber units: voice-only subscribers 112, voice/data subscribers 114, and data-only subscribers 116. The voice-only subscribers 112 are contemplated to be any existing trunked subscriber unit having a compatible signalling protocol to allow interaction with the system (100). The data-only subscribers (116) are contemplated to be any multiple or single channel data transceivers such as the KDT 800 TM, manufactured by Motorola, Inc., or functional equivalent. Of course, receive-only data devices, such as any of the Motorola family of display pagers, may also operate to receive paging data over an assigned data channel. In this way, the trunked system of the present invention accommodates existing equipment, while providing enhanced communication capabilities. Subscriber units are typically comprised of either mobile, portable or control stations. Typically, mobile units are understood to be transceivers designed to operate in a vehicle. A portable unit is typically understood to be a transceiving or receive-only device designed primarily to be carried on or about the person. Control stations are usually permanent or semi-permanent installations in buildings or other such fixed locations. These are collectively referred to herein as subscriber units, which communicate with one another through the fixed-end equipment.

As previously mentioned, the first data channel allocated is defined as the master data channel, the identity of which is periodically transmitted to all subscribers over the control channel. The data subscribers (114 and 116) each determine their assigned data channel from information transmitted over the master data channel, in addition to some locally calculated information stored in a data channel table, which is calculated when a subscriber first "powers up". The unit's ID code is used as a parameter in an algorithm that generates all possible data channel assignments (i.e., up to and including the case of all of the data equipped channels being allocated for data traffic). Each of these assignments is based upon the deterministic output of the algorithm, that is selected to assure that all subscribers in a particular group (or subgroup) are assigned to the same data channel. Those skilled in the art will appreciate that some criteria is required to decide how to distribute data users. The group (or subgroup) basis provides a convenient decision criteria by which to assign data users. Of course, other bases are available and the particular basis used in any particular implementation is not critical to the practice of the present invention. Moreover, the particular algorithm used is not critical to the practice or understanding of the present inventive method. Such deterministic algorithms are widely known and used in the art and any particular algorithm (including, for example, simple division or addition operations) that produce a deterministic result such that all members of the same group are assigned the same data channel is suitable for use with the present inventive method. In this way, data subscribers may select a data channel and "up-load" or "down-load" information to or from the host computer 106 (or 118). As used herein, "up-load" means the transference of data or executable code from a subscriber unit to a host computer. The term "download" means the transference of data or executable code from a host computer to a subscriber unit.

Of course, the particular data channel assignment will depend upon the actual number of data channels currently available. For example, a particular subscriber unit may select data channel one if the current number of data channels is two. If the number of channels is three, channel two may be selected, and so on. Of course, if there is only one data channel available, all data subscribers will use that channel.

When a particular number of data channels is assigned, the central 102 monitors the voice activity, while the network controller 108 monitors the activity on the data channels. This activity monitoring is preferably performed for a predetermined period of time. For example, the monitoring activity may be done by the hour (or half hour) so that during peak loading times the trunked system (100) can quickly adapt to reallocate the channel resources. If the network controller determines that the data activity on the assigned data channels has exceeded a predetermined supervisor selected threshold, the network controller 108 requests the central to allocate another channel for data traffic. Conversely, if the central determines that voice activity has exceeded a predetermined threshold, the central 102 requests the network controller to relinquish a data channel. In this way, the trunked system 100 adapts to reallocate the channel resources.

According to the present invention, reallocation begins by transmitting a "revert to master" command over all currently assigned data channels. When the subscriber units receive this command, they all revert to the master data channel to listen for new data channel assignments. The allocated data channels may be incremented or decremented by a predetermined number (one of the preferred embodiment) and the new allocation or number of data channels may be broadcast along with the identity of each data channel. The subscriber units receiving this information peruse the available data channels assignments in the data channel table, and select the appropriate assignment. In this way, the number of data channels can be conveniently incremented or decremented depending upon data traffic.

In addition to overall data traffic monitoring, the network controller 108 may determine that the data traffic load on a particular data channel is excessive. Accordingly, the present invention contemplates a method to balance the data traffic over the available data channels. This is accomplished by transmitting a load leveling command that may include an offset "seed" for use with the ID code and the data channel assignment algorithm. To "load level", the subscriber units recalculate the data channel table using the unit's ID code and the offset seed. In this way, there is a statistical probability that the load will be spread over the available data channels as opposed to being congested onto a particular data channel. The data traffic may then be monitored over the next operating period, and if the load is still unbalanced a different offset seed may be transmitted to again redistribute the data load.

Those skilled in the art will appreciate that it is often desirable to communicate with all subscriber units at one time in response to either an emergency, or to distribute a message of general concern. For example, a message announcing some emergency condition or that the host computer 106 (or 118) will be down for repair are examples of messages that would be convenient to transmit to all subscribers at one time. Accordingly, the present invention achieves this operation by transmitting the revert to master command over all allocated data channels. All subscribers respond to this command by listening to the master data channel. Just prior to retransmitting the current number of data channels and their identities (which may be unchanged), a system broadcast message is transmitted so that all subscribers may receive the message prior to receiving the data channel information. In this way rapid system wide communication is provided by the present inventive method. After receiving the system message, the data subscribers may return to their assigned data channels Referring now to FIG. 2, an illustration of the preferred signalling format for the master data channel is shown. The signalling format 200 begins with a preamble portion 202, which may include synchronization or framing information for the data subscriber units Following the preamble 202 is an optional block 204 wherein either a system message or an offset seed may be transmitted to effectuate either the system message operation or the load leveling procedure previously mentioned. Of course, during normal operations format block 204 would not be used and the preamble 202 would directly precede block 206.

Basically, block 206 transmits the total number of currently available data channels (be it 1, 2, 5, etc.) in any suitable form. Following block 206 are a plurality of blocks (208a through 208n) which transmit the identity of the data channels. In the preferred embodiment, the transmitted identity of the data channels is the actual frequency of the channels. Alternately, the channels could be assigned a designated number and the selected ones available for data use transmitted. For example, if a particular system has five channels, it may be convenient to label them 1-5. Then, assuming the subscribers knew the frequencies, the numbers "4" and "5" may be transmitted to indicate that channels four and five are the data channels. The preferred method, however, is to transmit the actual frequencies, since this allows for simple expansion of the system, and limits the amount of information required to reside in the subscriber units.

Therefore, if there is one data channel (i.e., the master data channel), that frequency will be transmitted in block 208a. If there are five data channels currently available (the master data channel plus four other data channels), those frequencies may be transmitted (for example in blocks 208a through 208e), and so on.

After the transmission of the identity of the last available data channel, the master data channel may be used by the subscriber units as a data channel as is illustrated by block 210.

To effectuate a recovery process, in case any particular subscriber unit should temporarily lose its data channel assignment, the central 102 and the network controller 108 may periodically transmit the signalling format 200 over the voice control channel and the master data channel, respectively. If through some error the data channel assignment is lost, the present invention provides for all data mode subscriber units to automatically revert to the master data channel. In this way, a subscriber unit may receive the periodic transmissions of the channel assignments from the master data channel and return to the proper data channel assignment. In the event a subscriber unit loses the identity of the master data channel, the present invention further provides for the subscriber units to revert to the voice control channel to receive the data channel allocation information.

Referring now to FIG. 3, the preferred format for other (i.e., not the master) data channels is shown. Basically, the format of a data channel 300 begins with a preamble 302, which may include synchronization and framing information. The preamble 302 precedes a plurality of variable length data messages 304–308.

As previously mentioned, the request for assignment of a data channel is prohibitively long compared to the typical data message transmission time. Therefore, the present invention contemplates a subscriber unit going to its assigned data channel and transmitting the data information without re-requesting the channel. Operating in this manner conserves spectrum and speeds transmission by eliminating the requirement to request a data channel. Of course, there exists the possibility that there will be data collisions on the data channels. However, data collision avoidance mechanisms and methods are widely known in the art and any suitable data collision avoidance and recovery method will be suitable for use in the present invention.

As illustrated in FIG. 3, the lengths of data messages 1, 2 and 3 (304, 306 and 308), are all of a variable duration depending upon the amount of information to be transmitted. Thus, once a subscriber unit gains access to a data channel, the subscriber may transmit data for as long as required to complete a data message. Of course, a second subscriber unit attempting to transmit data may be required to wait until the first subscriber has completed transmitting. Thus, a data channel may be in constant or near constant use. During periods of high data channel use, the preamble portion 302 need not be transmitted since the subscribers may still be synchronized t the incoming data. However, if the data channel use is low, the network controller 108 or a data subscriber may transmit the preamble portion 302 prior to transmitting.

Figure 4:
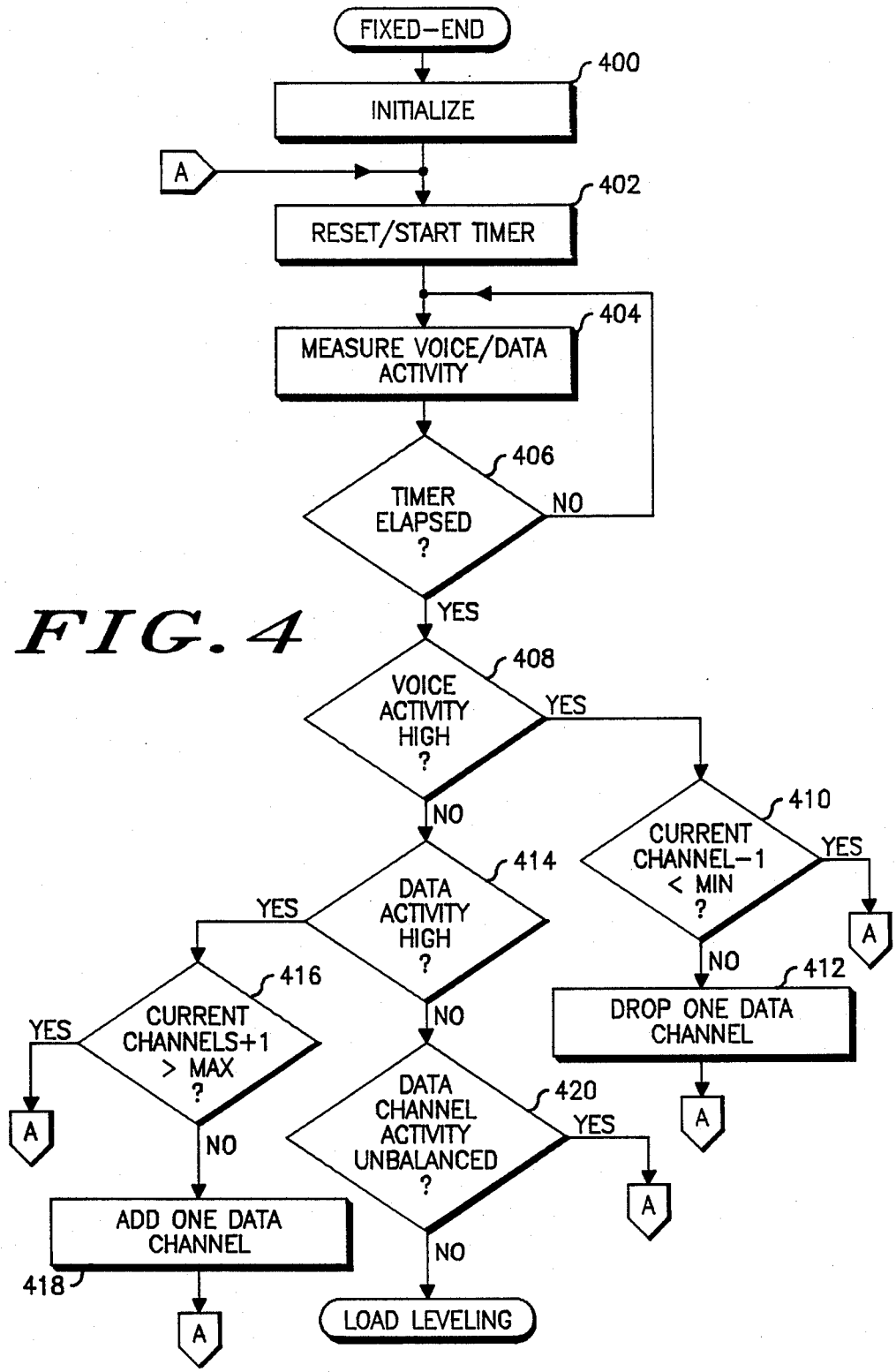
FIG. 4 is a flow diagram illustrating the steps executed by the fixed-end equipment of FIG. 1 in accordance with the present invention.

Referring now to FIG. 4, there is shown a flow diagram illustrating the steps executed by the fixed-end equipment to implement the present invention The routine begins with initializing step 400, wherein the central controller 102 and the network controller 108 may set aside memory space or perform other such functions as any particular system may require. The routine next proceeds to step 402, which starts the period timer over which the central controller 102 monitors the voice activity and the network controller monitors the data activity. In step 404, these measurements are taken such as by calculating the air-time billing information or other such suitable means. Following step 404, decision 406 determines whether or not the time has elapsed. If the timer has not elapsed, a loop is formed with step 404 until decision 406 determines that the timer has expired.

Decision 408 determines whether the voice activity is high when compared to a selected threshold that may be specified by the system supervisor. If the determination of decision 408 is that the voice activity is high, decision 410 determines whether the current number of data channels minus a predetermined offset (one in the preferred embodiment) would be less than the minimum number (if any) of data channels specified by the system supervisor. If so, decision 410 returns control to reference letter A, which resets the timer and the routine begins again. If, however, decision 410 determines that removing a channel would not be below the minimum allowed data channels, or there is no minimum, the routine proceeds to step 412, which de-allocates a channel from data traffic and returns it to voice traffic. The routine then proceeds to reference letter A of FIG. 4.

If the determination of decision 408 is that the voice activity is not high, the routine proceeds to decision 414, which determines whether the data activity is high compared to a predetermined threshold selected by the system supervisor. If the determination of decision 414 is that the data activity is high, the routine proceeds to decision 416, which determines whether the current number of channels plus one (in the preferred embodiment) is greater than the maximum number (if any) specified by the system supervisor. If the determination of decision 416 is that the additional channel would exceed the maximum, the routine returns control to reference letter A. If, however, decision 416 determines that the addition of a data channel will not exceed the maximum, the routine proceeds to step 418, which allocates an additional channel from voice traffic to data traffic. The routine then returns control to reference letter A of FIG. 4.

Additionally, the fixed-end equipment may take traffic priorities into account before the allocation step 418 and the de-allocation step 412. If, for example, a particular system favored voice traffic, an additional data channel may not be allocated if voice traffic were above a predetermined minimum. Alternately, for a system having a data traffic preference, a data channel may not be re-allocated for voice traffic if data traffic was above a predetermined threshold. In the absence of either a voice traffic or data traffic preference, the absolute allocation and de-allocation procedure of FIG. 4 is preferred.

Referring still to FIG. 4, if the determination of 414 is that the data activity as a whole is not high, the routine proceeds to decision 420 to determine whether the data traffic across all available data channels is balanced or unbalanced. If the determination of decision 420 is that the traffic is essentially balanced, the routine returns control to reference letter A, which resets the timer of step 402. If, however, decision 420 determines that the data traffic is unbalanced the routine proceeds to the load leveling routine of FIG. 5a.

Figure 5A:
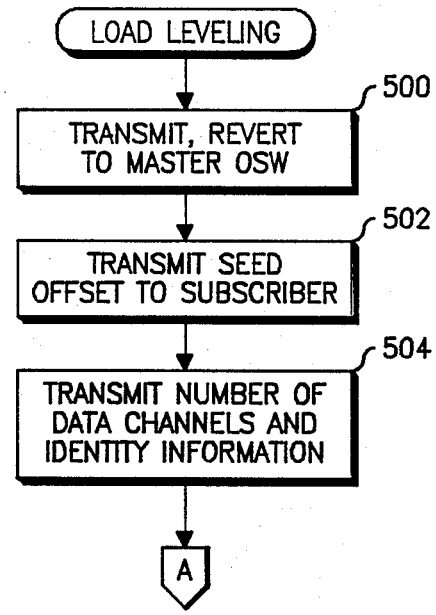
FIG. 5a is a flow diagram illustrating the steps executed by the fixed-end equipment of FIG. 1 to perform the load leveling of subscriber units to available data channels in accordance with the present invention.

Referring now to FIG. 5a, the steps executed by the network controller 108 to execute a load leveling of data traffic across the available data channels is described. The routine begins in step 500, which transmits a revert to master command across all data channels. Upon receipt of the command, the data subscribers listen to the master data channel and may receive an offset seed parameter or a load leveling command transmitted as block 204 of FIG. 2 (block 502 in FIG. 5a).

Preferably, each subscriber completely recalculates the data channel table based upon the unit's ID code, together with the offset seed, and stores the table in a suitable memory means (such as random access memory) within the subscriber unit. Alternately, if the total number of seeds were suitably small, all of the seeds may be either permanently stored in, or transmitted to, the subscriber, and all possible assignments using all the possible seeds may be calculated. This method saves later calculation time at the expense of memory in the subscriber units.

The load leveling routine of FIG. 5 next proceeds to step 504, where the number of available data channels and their identities are transmitted over the master data channel. Of course, the total number may not have changed, but simply the offset seed parameter may have been added to statistically redistribute the groups (or subgroups) across the available data channels. As previously mentioned, if after monitoring the next transmission period, the data traffic load remains unbalanced, a different offset seed may be transmitted until an acceptable balance is obtained between the data traffic and the available data channel resources.

Figure 5B:
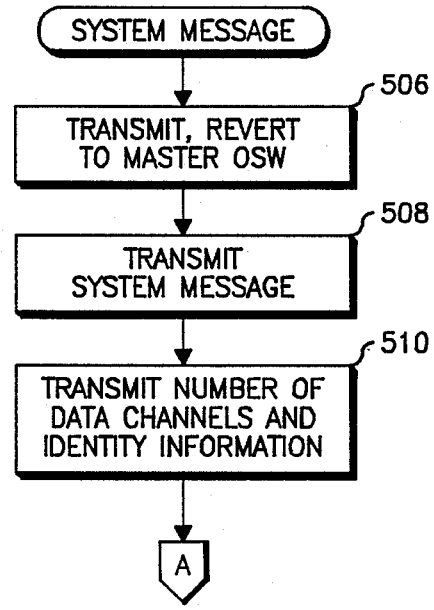
FIG. 5b, is a flow diagram of the steps executed by the fixed-end equipment of FIG. 1 to transmit a system message to the subscriber units in accordance with the present invention.

Referring now to FIG. 5b, the steps executed by the network controller 108 to broadcast a system wide data message is shown. The routine begins in step 506, where the revert to master command is transmitted to all data subscribers. Next, in step 508, the system message is transmitted (see FIG. 2, block 204) to the subscriber units over the master data channel. Following step 508, the current number of data channels and their identities (which may be unchanged) are transmitted in step 510. In this way, a message of general concern may be rapidly and efficiently transmitted to all data subscriber units. Lastly, after step 510, the routine returns to reference letter A of FIG. 4. After receiving the system message, the subscribers may return to their assigned data channels.

Figure 6A:
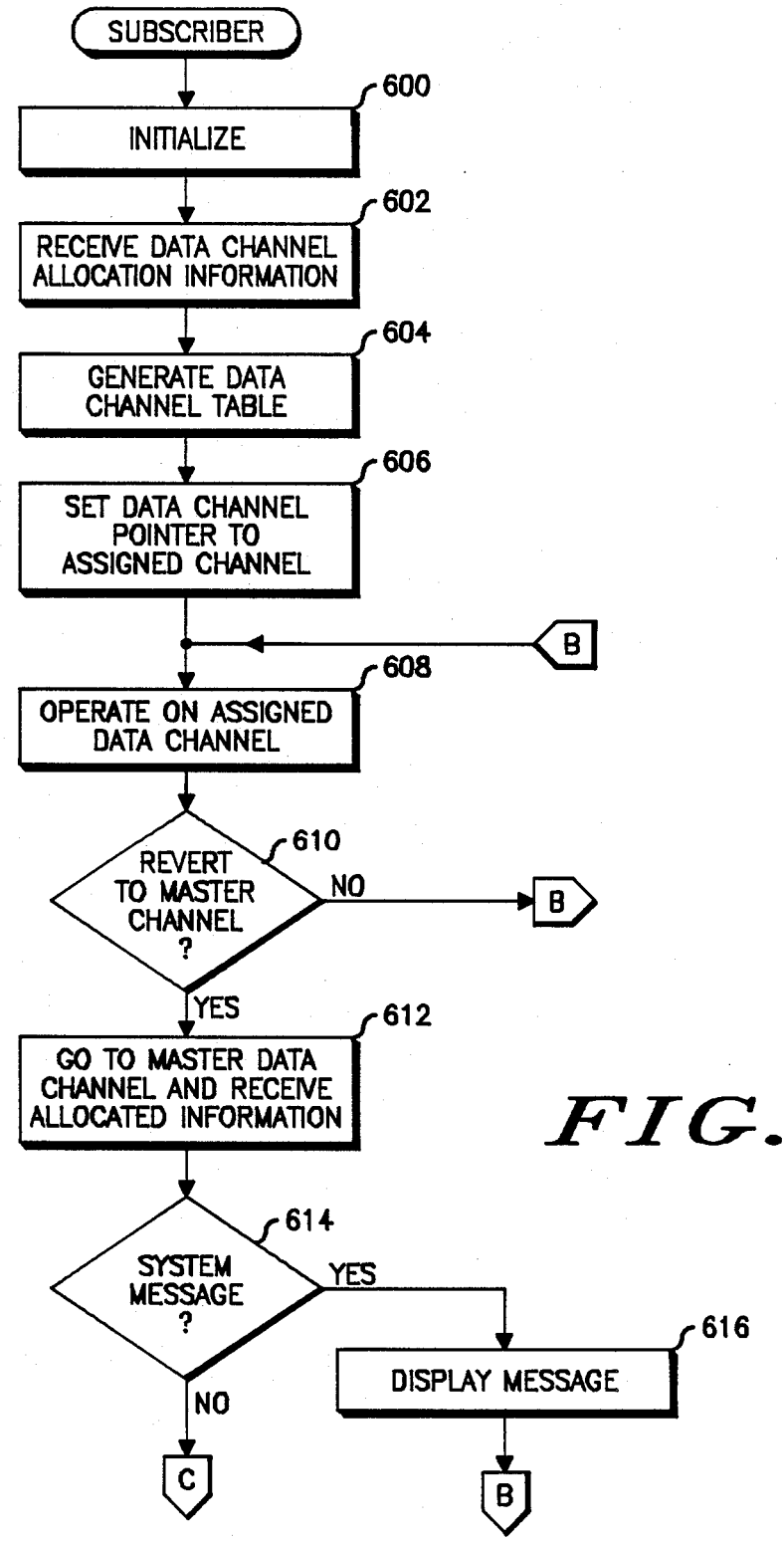
FIGS. 6a and 6b are flow diagrams illustrating the steps executed by the data subscribers of FIG. 1.
Figure 6B:
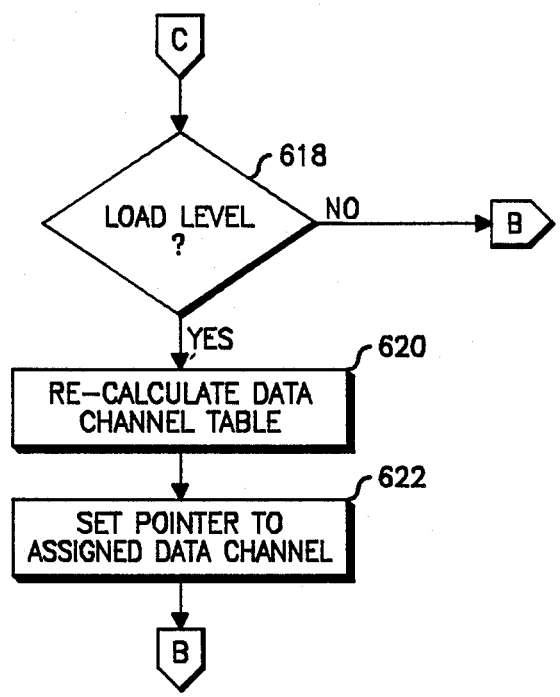

Referring now to FIGS. 6a and 6b, there are shown flow diagrams illustrating the steps executed by a data subscriber unit (114 or 116) in accordance with the present invention. In FIG. 6a, the routine begins in step 600, where the data subscriber performs any initialization steps required in any particular implementation. In step 602 the data subscriber receives the data channel allocation information from either the voice control channel or the master data channel. Additionally, those subscribers monitoring the master data channel may receive a system message (see FIG. 2).

Step 604 generates the data channel assignment table using the subscriber unit talk-group ID code and any suitable algorithm, which provides a determinable assignment such that all subscriber units having the same talk-group ID are assigned the same data channel. These channel assignments are calculated for all possibilities of data channels (i.e., from 1 through the maximum number of data equipped channels currently available on a particular system) and stored in any convenient storage means such as a random access memory (RAM). Alternately, steps 602 and 604 may be reversed.

Once the subscribers have calculated the data channel table and received the data channel allocation information, each subscriber sets a pointer (in step 606), which assigns the subscriber unit one of the available data channels from the assignments in the data channel table.

In step 608, the data subscriber operates to receive and transmit data information on the assigned data channel. Decision 610 determines whether a "revert to master" command was received. If so, the subscriber goes to the master control channel to receive the data channel allocation information in step 612; otherwise, the routine returns to reference letter B to continue data operations.

Decision 614 determines whether the data allocation information contained a system message. If so, the data subscriber stores or displays the message as appropriate. For example, the data subscriber may display the message (step 616) on any suitable display means. Optionally, the data subscriber may generate a "hard copy" on a printer or use a speech synthesizer to render the message audible. If the determination of decision 614 is that the data channel allocation information does not contain a system message, the proceeds to reference letter C of FIG. 6b.

Referring now to FIG. 6b, decision 618 determines whether the data channel allocation information contained a load leveling command or a new offset seed. If so, the data subscriber re-calculates the data channel table (step 620), using its talk-group ID and the offset seed. Additionally, the subscriber receives the data channel allocation information (see FIG. 2). In step 622, the subscriber sets a pointer to assign a data channel, which may be different than its previous data channel assignment. After selecting a data channel, the routine proceeds to reference letter B wherein the subscriber returns to normal data communication.

While a particular embodiment of the invention has been described and shown, it should be understood that the invention is not limited thereto since many modifications may be made. It is therefore contemplated by the present application to cover any and all such modifications that may fall within the true spirit and scope of the basic underlying principles disclosed and claimed herein.

What is claimed is:

1. In a trunked voice/data communication system, having a plurality of subscribers each having an identification (ID) code and being constructed and arranged to communicate over a plurality of communication channels, some of which may be allocated for data communication, and a particular one of which is designated as a control channel, a method for leveling the data traffic over at least two allocated data channels, comprising the steps of:
   (a) measuring the amount of data traffic on each allocated data channel;
   (b) determining whether said measured data traffic is appropriately distributed;
   (c) commanding each data subscriber to monitor a predetermined one of said allocated data channels;
   (d) transmitting a digital number representing an offset parameter over said predetermined one of said allocated data channels;
   (e) transmitting the identity of each of said allocated data channels over said said predetermined one of said allocated data channels;

(f) operating on said digital number, in response to receiving same, and on a subscriber's ID code, to generate a data channel table, which comprises possible data channel assignments;

(g) selecting a data channel assignment from said data channel table in response to receiving said identity of each of said allocated data channels;

(h) operating, thereafter, on said selected data channel.

2. The method of claim 1, wherein step (f) includes the step of varying the number of allocated data channels prior to step of transmitting.

3. The method of claim 2, wherein said varying step comprises increasing the number of allocated data channels by a predetermined number of channels 4. The method of claim 3, wherein said varying step comprises increasing the number of allocated data channels by one channel 5. The method of claim 2, wherein said varying step comprises decreasing the number of allocated data channels by a predetermined number of channels 6. The method of claim 5, wherein said varying step comprises decreasing the number of allocated data channels by one channel.

7. In a trunked voice/data communication system, having a plurality of subscribers each having an identification code (id) and being constructed and arranged to communicate over a plurality of communication channels, a particular one of which is designated as a control channel for communicating first data information, and some of which may be allocated as data channels for communicating second data information, a method for transmitting a system-wide user message to each data subscriber, comprising the steps of:

(a) commanding each data subscriber to monitor a predetermined one of said allocated data channels;

(b) transmitting a message over said predetermined one of said allocated data channels;

at each data subscriber:

(c) operating on said message, in response to receiving same, to effectuate at least one of the operations of the group of:
 (i) displaying said message;
 (ii) printing said message;
 (iii) storing said message;

(d) returning to a previously assigned data channel.

8. The method of claim 7, wherein step (b) includes the step of transmitting the identity of each of said allocated data channels over said predetermined one of said allocated data channels.

9. The method of claim 8, wherein said returning step (d) comprises;
 (d1) selecting a data channel assignment from a data channel table in response to receiving said identity of each of said allocated data channels;
 (d2) operating, thereafter, on said selected data channel.

10. In a trunked voice/data communication system, having a plurality of subscribers each having an identification code (id) and being constructed and arranged to communicate over a plurality of communication channels, a particular one of which is designated as a control channel for communicating first data information, and some of which may be allocated as data channels for communicating second data information, a method for transmitting a system-wide user message to each data subscriber, comprising the steps of:

(a) commanding each data subscriber to monitor a predetermined one of said allocated data channels;

(b) transmitting a message over said predetermined one of said allocated data channels;

(c) transmitting the identity of each of said allocated data channels over said predetermined one of said allocated data channels;

at each data subscriber:

(d) operating on said message, in response to receiving same, to effectuate at least one of the operations of the group of:
 (i) displaying said message;
 (ii) printing said message;
 (iii) storing said message;
 (iv) synthesizing a voice message;

(e) selecting a data channel assignment form a data channel table in response to receiving said identity of each of said allocated data channels;

(f) operating, alternately, on said selected data channel or returning to a previously assigned data channel.

* * * * *

UNITED STATES PATENT AND TRADEMARK OFFICE
CERTIFICATE OF CORRECTION

PATENT NO. : 4,831,373
DATED : May 16, 1989
INVENTOR(S) : Hess, Garry C.

It is certified that error appears in the above-identified patent and that said Letters Patent is hereby corrected as shown below:

Col. 12, line 39, "form" should be --from--.

Signed and Sealed this

Tenth Day of July, 1990

Attest:

HARRY F. MANBECK, JR.

*Attesting Officer*          *Commissioner of Patents and Trademarks*